US 6,547,444 B2

(12) United States Patent
Kiani

(10) Patent No.: US 6,547,444 B2
(45) Date of Patent: Apr. 15, 2003

(54) TECHNIQUES FOR SELECTIVELY EXPOSING AND PROTECTING AN OPTICAL INTERFACE USING FILM

(75) Inventor: Sepehr Kiani, Watertown, MA (US)

(73) Assignee: Teradyne, Inc., Boston, MA (US)

( * ) Notice: Subject to any disclaimer, the term of this patent is extended or adjusted under 35 U.S.C. 154(b) by 261 days.

(21) Appl. No.: 09/774,734

(22) Filed: Jan. 31, 2001

(65) Prior Publication Data
US 2002/0102063 A1 Aug. 1, 2002

(51) Int. Cl.[7] .............................. G02B 6/36; H01R 13/44
(52) U.S. Cl. ........................................ 385/53; 439/145
(58) Field of Search ............................. 385/53, 19, 50, 385/55, 58, 77, 134, 147; 15/210.1; 350/96.2; 439/135, 145

(56) References Cited

U.S. PATENT DOCUMENTS

| 4,076,400 | A | * | 2/1978 | Persha et al. ................. 353/95 |
| 4,425,375 | A | * | 1/1984 | Abramson ................... 427/494 |
| 4,436,366 | A | | 3/1984 | Abramson ................. 350/96.2 |
| 5,117,528 | A | * | 6/1992 | Kanayama et al. ......... 15/210.1 |
| 5,220,703 | A | | 6/1993 | Kanayama et al. ......... 15/210.1 |
| 5,768,738 | A | | 6/1998 | Lee ............................. 15/210.1 |
| 6,064,834 | A | * | 5/2000 | Fukuda et al. .............. 396/380 |

FOREIGN PATENT DOCUMENTS

EP   1 048 963 A1   11/2000   ............ G02B/6/38

OTHER PUBLICATIONS

European Patent Office; Patent Abstracts of Japan; Publication No.: 2002031739; Publication Date: Jan. 31, 2002; Application No.: 2000215365; Applicant: NTT Advanced Technology Corp.; 1 page.
International Search Report from International Application No. PCT/US 02/02608, filed Jan. 30, 2002, 5 Pages.

* cited by examiner

Primary Examiner—Lynn D. Feild
Assistant Examiner—Chandrika Prasad
(74) Attorney, Agent, or Firm—Chapin & Huang, L.L.C.; David E. Huang, Esq.

(57) ABSTRACT

The invention is directed to techniques for controlling access to an optical interface using film having windowed sections and non-windowed sections. The windowed and non-windowed sections are selectively positioned over an optical interface location that holds the optical interface in order to protect the optical interface. Preferably, such positioning occurs in an automated manner such that a technician need not perform an extensive cleaning step each time fiber optic equipment requires handling, e.g., each time a fiber optic connector of a fiber optic component is unplugged and re-plugged. In one arrangement, an optical connector housing holds the optical interface in an optical interface location of the optical connector housing, and a film positioning assembly selectively positions windowed and non-windowed sections of film over the optical interface location in order to selectively expose and protect the optical interface.

20 Claims, 10 Drawing Sheets

TECHNIQUES FOR SELECTIVELY EXPOSING AND PROTECTING AN OPTICAL INTERFACE USING FILM

BACKGROUND OF THE INVENTION

A typical fiber optic connection between a first fiber optic component and a second fiber optic component (e.g., between two fiber optic cables, between a fiber optic cable and a fiber optic module, etc.) is formed by aligning an optical interface of the first fiber optic component (e.g., an end of a fiber optic cable) with an optical interface of the second fiber optic component (e.g., an end of another fiber optic cable or a fiber optic module).

Clean optical interfaces tend to form fiber optic connections with less light distortion and less light energy loss than dirty optical interfaces. Accordingly, fiber optic component manufactures and companies that install fiber optic equipment typically take steps to provide clean optical interfaces. For example, fiber optic cable manufacturers typically polish the optical interfaces of fiber optic cable assemblies (a portion of fiber optic cable with a fiber optic connector terminating each end) prior to releasing such assemblies into the stream of commerce.

Nevertheless, once a fiber optic component is removed from its packaging and handled, it becomes susceptible to dust and dirt. Over time the accumulation of dust and dirt can become significant, e.g., after unplugging and plugging-in a fiber optic connector of a fiber optic cable assembly multiple times. In extreme situations, the amount of light energy loss can become so great that light detection circuitry at the end of the fiber optic pathway is no longer able to detect the light signal.

To avoid such situations, fiber optic equipment installation companies typically train their technicians to clean the optical interfaces of fiber optic cable assemblies prior to use, i.e., prior to connecting the fiber optic cable assemblies with other fiber optic components. For example, some companies train their technicians to wipe the optical interfaces with cleaning material (e.g., cleaning fabric or cleaning paper) that tends to remove dirt and dust from the optical interfaces without depositing additional dirt and dust. Other companies train their technicians to apply a stick-on adhesive to the optical interfaces and then remove the stick-on adhesive in order to remove the dirt and dust. Yet other companies train their technicians to spray the optical interfaces with fluid from an aerosol can to blow away the dirt and dust from the optical interfaces.

Furthermore, some fiber optic component manufacturers attempt to protect the connectors of fiber optic cable assemblies by providing a fiber optic coupling, called an adaptor, which has a trap door on each end to receive a fiber optic cable connector. When a first fiber optic cable connector plugs into an end of the adaptor, the trap door at that end opens to allow the first connector to enter. When a second fiber optic cable connector plugs into the other end of the adaptor, the trap door at the other end opens to allow the second connector to enter and form a set of fiber optic connections with the first connector within the adaptor.

SUMMARY OF THE INVENTION

Unfortunately, there are deficiencies to the above-described conventional approaches to maintaining clean optical interfaces on fiber optic components. In particular, the performance evaluations of technicians are typically based, at least in part, on the amount of time the technicians take to install and activate their fiber optic equipment. Accordingly, some technicians may forget to clean or purposefully omit cleaning the optical interfaces of the fiber optic equipment in their haste to finish installations. For example, some technicians perform a visual inspection of the optical interfaces prior to any manual cleaning step. If there is no visual sign of dust or dirt on the optical interfaces, the technician concludes that cleaning is unnecessary and does not clean the optical interfaces. Nevertheless, such dirt and dust could exist but simply be visually undetectable. As a result, the visually undetectable dust and dirt degrades performance of the fiber optic component (e.g., distorts the fiber optic signals, reduces the effective length of the fiber optic pathways, etc.).

Additionally, in the conventional cleaning approach that involves a technician wiping optical interfaces with cleaning material (e.g., fabric or paper), the cleaning material can become contaminated (e.g., from prior use). Accordingly, the technician could inadvertently introduce dirt and dust onto the optical interfaces rather than remove dirt and dust.

Furthermore, some fiber optic components are disposed in locations which are difficult for a technician to access. For example, fiber optic modules could be mounted to a backplane within a card cage. Such modules could be easily accessible by a long circuit board having corresponding fiber optic modules mounted thereon, but difficult for a technician to reach manually. Accordingly, having a technician manually wipe the hard-to-reach optical interfaces with cleaning material or manually apply and remove a stick-on adhesive could be extremely burdensome. As such, the technician may chose to eliminate that part of the installation procedure even though it is technically required by the fiber optic installation company.

Additionally, the above-described conventional adaptor, which has a trap door on each end, provides no protection to fiber optic cable connectors when the fiber optic connectors are not plugged in. That is, prior to being plugged-in, the fiber optic connectors are susceptible to dust and dirt and can become contaminated. Furthermore, the trap doors of the adaptor tend to trap dust and dirt within the adaptor which interferes with the ability of fiber optic connectors to form a reliable set of fiber optic connections within the adaptor.

In contrast to the above-described conventional approaches to ensuring that optical interfaces are regularly cleaned when handled (e.g., requiring technicians to perform manual cleaning procedures) and to protect fiber optic connectors of cable assemblies with an adaptor having trap doors, the invention is directed to techniques that control access to optical interfaces using film having windowed sections and non-windowed sections. The windowed and non-windowed sections are selectively positioned over an optical interface location that holds an optical interface in order to selectively expose and protect that optical interface. Preferably, such positioning occurs in an automated manner such that a technician need not perform an extensive manual cleaning step each time fiber optic equipment requires handling, e.g., each time a fiber optic connector of a fiber optic component is unplugged and re-plugged.

One arrangement of the invention is directed to an optical component having an optical interface, and an optical connector. The optical connector includes (i) an optical connector housing that holds the optical interface in an optical interface location of the optical connector housing, (ii) film having windowed sections and non-windowed sections, and (iii) a film positioning assembly coupled to the optical connector housing.

The windowed and non-windowed sections of the film are interleaved with each other. The film positioning assembly selectively positions the windowed and non-windowed sections of the film over the optical interface location in order to selectively expose and protect the optical interface. Accordingly, a non-windowed section of the film can cover the optical interface location when the optical component is unconnected (e.g., when the optical component is handled by a technician), and a windowed section of the film can be moved over the optical interface location as the optical component is connected to another component in order to enable the other component to access the optical interface at the optical interface location.

In one arrangement, the film positioning assembly includes a source reel and a destination reel, each of which is coupled to the optical connector housing. The source reel rotates to provide the sections of the film. The destination reel rotates to receive the sections of the film. Such an arrangement provides for orderly feeding and taking up of the film.

Preferably, the film positioning assembly further includes at least one tension spring (e.g., a first tension spring for the source reel, and a second tension spring for the destination reel). The tension springs to provide tension to the film. Accordingly, any slack, which could otherwise cause improper positioning of a section of film over the optical interface location, can be removed.

In one arrangement, the film positioning assembly further includes a ratchet assembly coupled to the optical connector housing. The ratchet assembly permits movement of the film from the source reel to the destination reel and prohibits movement of the film from the destination reel to the source reel. Accordingly, in this arrangement, each section of the film is used only once and never inadvertently reused in a manner that could contaminate the optical interface. Preferably, the film positioning assembly is configured to enable removal and replacement of the film (e.g., when all of the sections of the film have been used).

In one arrangement, the optical connector housing defines a set of film lift surfaces that (i) passes through windows of the windowed sections of the film, and (ii) pushes the non-windowed sections of the film out of contact with the optical interface.

In this arrangement, the set of film lift surfaces prevent the non-windowed sections of the film from inadvertently damaging the optical interface when they move over the optical interface location (e.g., from inadvertently scratching or contaminating the optical interface).

In an alternative arrangement, the optical connector housing does not include such lift surfaces. Rather, in this arrangement, each non-windowed section of the film includes cleaning material (e.g., a solvent, a cleaning fabric, etc.) that contacts the optical interface when the film positioning assembly selectively positions that non-windowed section of the film over the optical interface location. Accordingly, movement of the non-windowed sections of the film over the optical interface (e.g., a transition from a windowed section to a non-windowed section, or a transition from a non-windowed section to a windowed section) provides automatic cleaning of the optical interface.

Another arrangement of the invention is directed to a fiber optic connection system having a first optical connector and a second optical connector. The first optical connector includes a first optical connector housing to hold a first optical interface in a first optical interface location of the first optical connector housing, and a first film positioning assembly that selectively positions windowed and non-windowed sections of a first film over the first optical interface location. Similarly, the second optical connector includes a second optical connector housing to hold a second optical interface in a second optical interface location of the second optical connector housing, and a second film positioning assembly that selectively positions windowed and non-windowed sections of a second film over the second optical interface location. Accordingly, the first and second optical connectors can control access to their respective optical interfaces, e.g., exposing the optical interface locations as the connectors connect, protecting the optical interface locations as the connectors disconnect, etc.

The features of the invention, as described above, may be employed in fiber optic systems, devices and methods and other computer-related components such as those of Teradyne, Incorporated of Boston, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for controlling access to an optical interface using film having windowed sections and non-windowed sections. The windowed and non-windowed sections are selectively positioned over an optical interface location, which holds the optical interface, in order to selectively provide access to the optical interface and protect the optical interface from dust and dirt. Preferably, such positioning of the film sections selectively exposes the optical interface (and the optical interface location) just before connection, and covers the optical interface just before disconnection, in an automated manner. Accordingly, it is unlikely that dirt or dust will contaminate the optical interface location, and a technician does not need to perform an extensive manual cleaning step each time the technician handles the fiber optic equipment, e.g., each time the technician disconnects or reconnects a fiber optic connector of a fiber optic component.

Figure 1A:
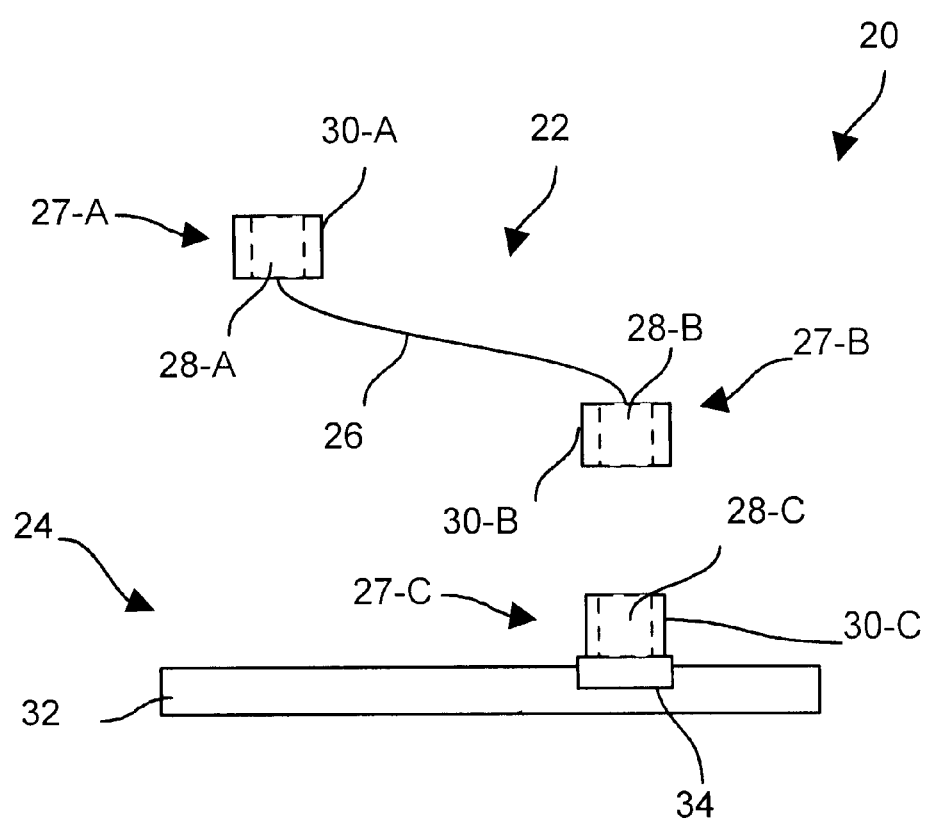
FIG. 1A is a block diagram of an optical connection system which is suitable for use by the invention.

FIG. 1A shows an optical connection system 20 which is suitable for use by the invention. The optical connection system 20 includes a fiber optic cable assembly 22 and a circuit board 24. The fiber optic cable assembly 22 includes a portion 26 of fiber optic cable, a fiber optic connector 27-A and another fiber optic connector 27-B. The fiber optic connector 27-A includes a ferrule 28-A for holding an optical interface in an optical interface location, and a film positioning assembly 30-A that fastens over the ferrule 28-A. Similarly, the fiber optic connector 27-B includes a ferrule 28-B for holding another optical interface in another optical interface location, and a film positioning assembly 30-B that fastens over the ferrule 28-B.

The circuit board 24 includes a section of circuit board material 32, fiber optic circuitry 34 (e.g., a transducer that converts electrical signals into fiber optic signals, and vice versa) and a fiber optic connector 27-C. The fiber optic connector 27-C includes a ferrule 28-C for holding an optical interface in an optical interface location, and a film positioning assembly 30-C that fastens over the ferrule 28-C.

The fiber optic circuitry 34 and the fiber optic connector 27-C form a fiber optic module. This fiber optic module and the fiber optic cable assembly 22 are examples of fiber optic components which are suitable for use by the invention.

Figure 1B:
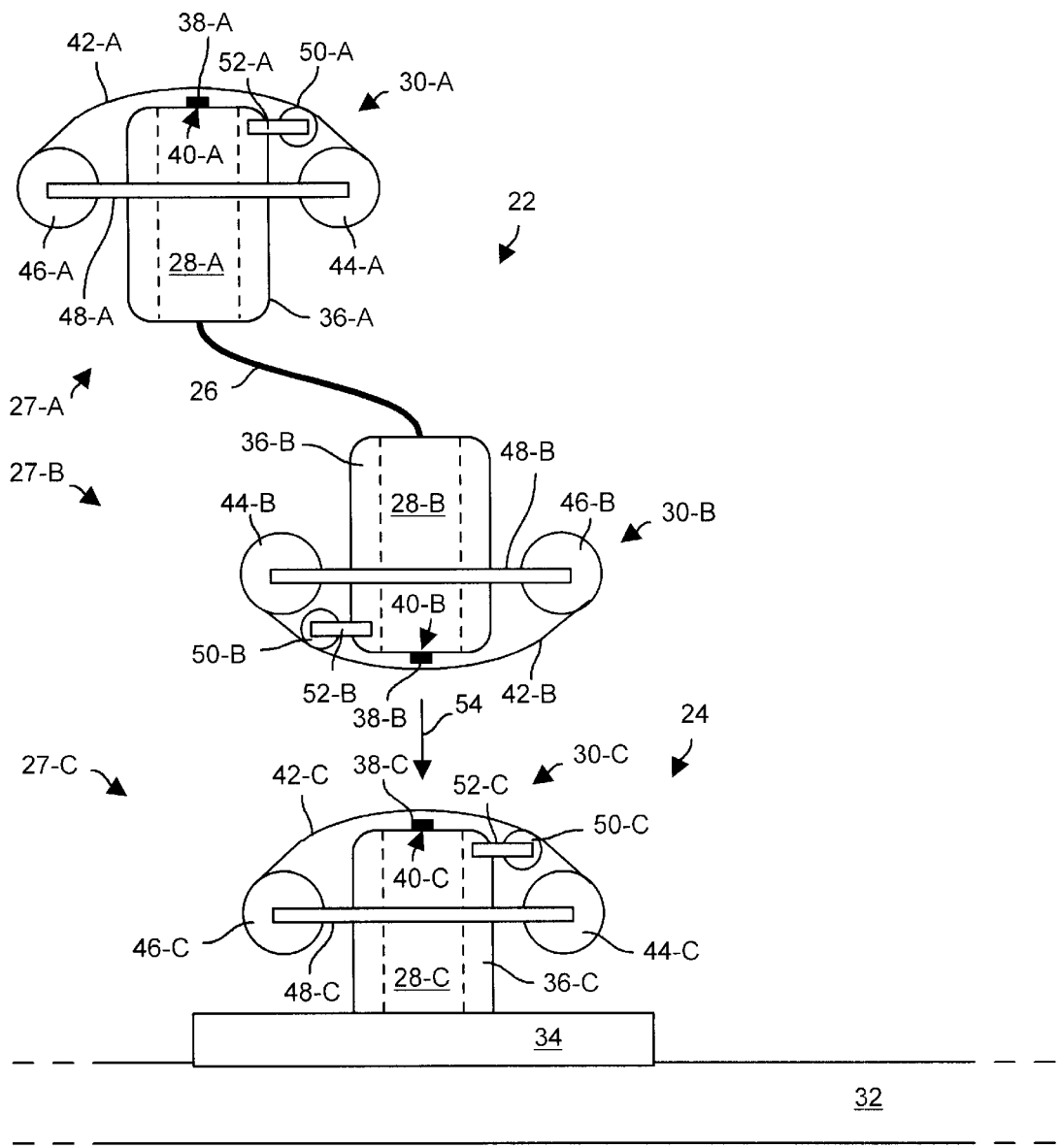
FIG. 1B is a detailed block diagram of the optical connection system of FIG. 1A.

FIG. 1B shows a more-detailed view of portions of the connection assembly 20 of FIG. 1A. As shown in FIG. 1B (and also FIG. 2), the film positioning assembly 30 of each fiber optic connector 27 includes an optical connector housing 36 for holding the ferrule 28 of that connector 27. For example, the film positioning assembly 30-B of the fiber optic connector 27-B includes an optical connector housing 36-B for holding the ferrule 28-B.

Additionally, located at the end of each ferrule 28 is an optical interface 38 (e.g., one or more fiber ends) which is positioned at an optical interface location 40 of that ferrule 28 and of the optical connector housing 36 holding that ferrule 28. For example, located at the end of the ferrule 28-B is an optical interface 38-B which is positioned at an optical interface location 40-B of the ferrule 28-B and of the optical connector housing 36-B.

As further shown in FIG. 1B, the film positioning assembly 30 of each connector 27 further includes film 42 that extends over the optical interface 38 of that connector 27. a source reel 46 that rotates to provide sections of the film 42, a destination reel 44 that rotates to receive the sections of the film 42, and a coupling mechanism 48 that couples the source and destination reels 44, 46 to the optical connector housing 36 of that connector 27. For example, the film positioning assembly 30-B of the connector 27-B further includes film 42-B that extends over the optical interface 38-B, a source reel 46-B, a destination reel 44-B, and a coupling mechanism 48-B that couples the source and destination reels 44-B, 46-B to the optical connector housing 36-B. The source and destination reels 44, 46 provide for orderly feeding and taking up of the film 42.

Each film positioning assembly 30 further includes a ratchet assembly 50, and a coupling mechanism 52 that couples the ratchet assembly 50 to the optical connector housing 36. For example, each film positioning assembly 30-B further includes a ratchet assembly 50-B, and a coupling mechanism 52-B that couples the ratchet assembly 50-B to the optical connector housing 36-B.

It should be understood that the fiber optic connectors 27 further include connecting structures that align and fasten the fiber optic connectors 27 together, i.e., to each other. Examples of such connecting structures include conventional connector guides, alignment posts, support and detention tabs, or the like, and are omitted from FIGS. 1A and 1B for simplicity. When the fiber optic connectors 27-B, 27-C are properly aligned and fastened together, e.g., when the optical connectors 27-B is moved toward the optical connector 27-C (see arrow 54), the optical interfaces 38-B, 38-C move flush against each other to form one or more optical connections. In one arrangement, each optical interface 38-B, 38-C includes an end of a portion of fiber optic cable such that one optical connection is formed. In another arrangement, each optical interface 38-B, 38-C includes an array of ends of a set of fiber optic cable portions (e.g., a ×6 array, a 2×12 array, etc.) such that multiple optical connections are formed. Preferably, the fiber ends of the optical interface 38 are rigidly fastened to the ferrules 28 (e.g., via epoxy). It should be understood that the lengths of the fiber optic cable portions can be longer than the heights of the optical connector housings 36 (e.g., for cable assemblies), or can be shorter than the heights of the optical connector housings 36 (e.g., for fiber optic modules). Further details of each connector 27 will now be provided with reference to FIG. 2.

Figure 2:
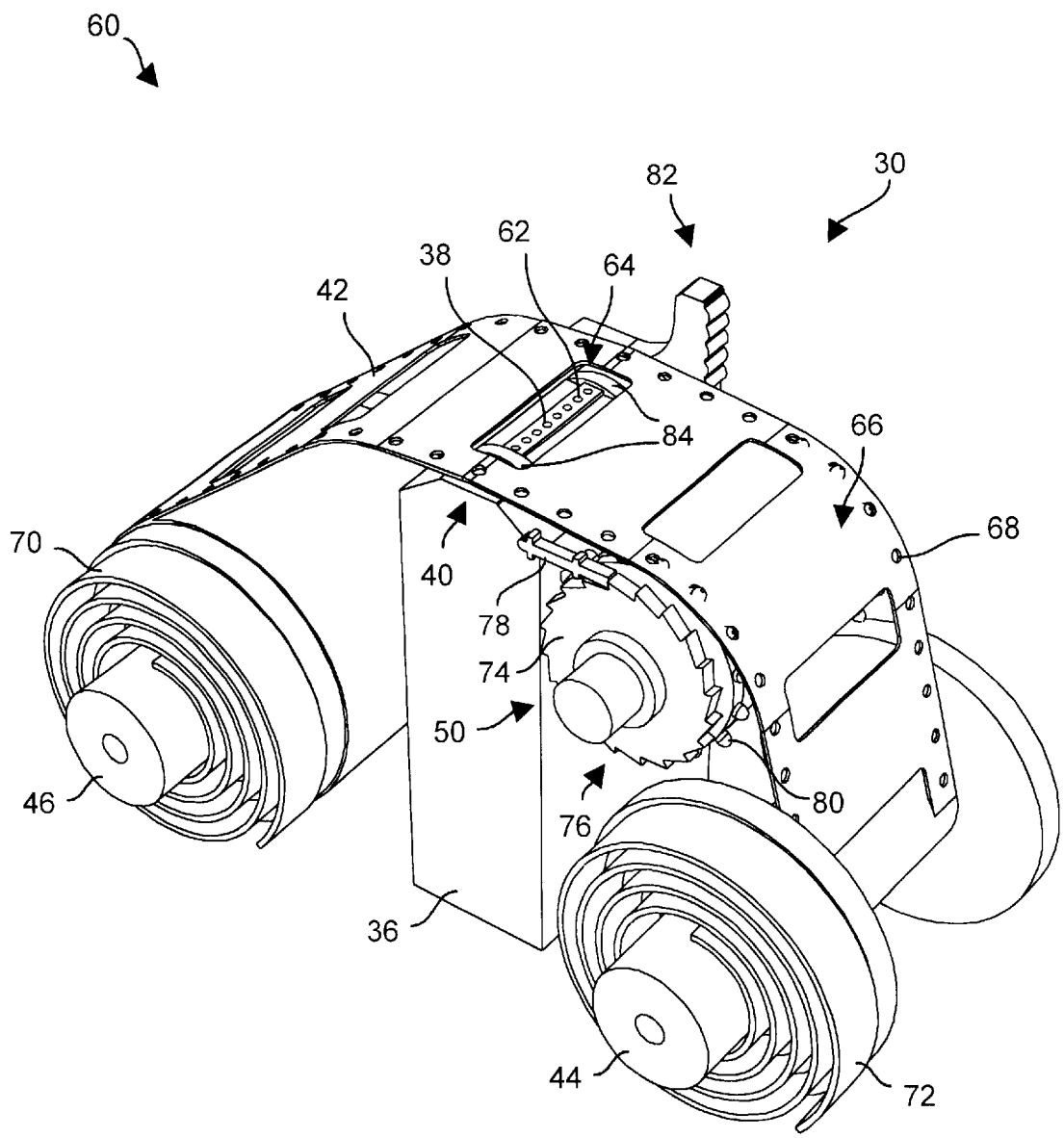
FIG. 2 is a perspective view of a portion of an optical connector of the optical connection system of FIGS. 1A and 1B.

FIG. 2 shows a perspective view 60 of portions of a connector 27. By way of example only, the optical interface 38 includes a 1×8 array of fiber ends 62. Windows 64 within the film 42 are large enough to expose the optical interface 38 when residing over the optical interface 38. The windows 64 are separated by film portions 66 which cover the optical interface 38 when residing over the optical interface 38. Additionally, the film 42 defines holes 68 along the edges of the film 42.

FIG. 2 further shows a tension spring 70 disposed around the source reel 46, and another tension spring 72 disposed around the destination reel 44. The tension springs 70, 72 provide tension to the film 42 in order to remove any slack that may exist in the film 42. Accordingly, any slack, which could otherwise cause improper positioning of a section of film over the optical interface location 40 (e.g., a buildup of film 42 over the optical interface location 36), can be removed.

As further shown in FIG. 2, the ratchet assembly 50 includes a ratchet gear 74 (e.g., a wheel) having teeth 76, and a ratchet arm 78 which is pivotally attached to the optical connector housing 36. The ratchet gear 74 further includes a ratchet sprockets 80 which engage the holes 68 along the edges of the film 42. As such the ratchet assembly 50 operates as a pulling or urging mechanism on the film 42.

The optical connector housing 36 defines a ratchet driver 82 for actuating the ratchet assembly 50 of the film positioning assembly 30 of another connector 27. Similarly, a ratchet driver 82 defined by the optical connector housing 36 of the other connector 27 actuates the ratchet assembly 50 of FIG. 2. In particular, that ratchet driver 82 displaces an end of the ratchet arm 78 a fixed number of times thus enabling the ratchet gear 74 to partially rotate, and allow the film 42 to move over the optical interface location 40. That is, when the film positioning assembly 30 mates with another film positioning assembly 30, the film 42 moves so that a window 64 of the film 42 moves over the optical interface 38 to expose the optical interface 38. Similarly, when the film positioning assembly 30 unmates with the other film positioning assembly 30, the film 42 moves so that a non-windowed film portion 66 of the film 42 covers the optical interface 38. Such operation can be repeated in an automated and a consistent manner without burdening a technician with a task of manually cleaning the optical interface 38.

The optical connector housing 36 further defines a set of lift surfaces 84 which frames the optical interface 38. Both the set of lift surfaces 84 and the optical interface 38 fits within the windows 64 of the film 42. Accordingly, as the film 42 passes over the optical interface location 40, the set of lift surfaces 84 passes through the windows 64 of the film 42, but pushes the non-windowed film portions 66 of the film 42 out of contact with the optical interface location 40 and the optical interface 38. As a result, the film 42 does not damage the optical interface 38 (e.g., scratch the optical interface 38) as it moves over the optical interface location 40. Further details of the invention will now be provided with reference to FIG. 3.

Figure 3:
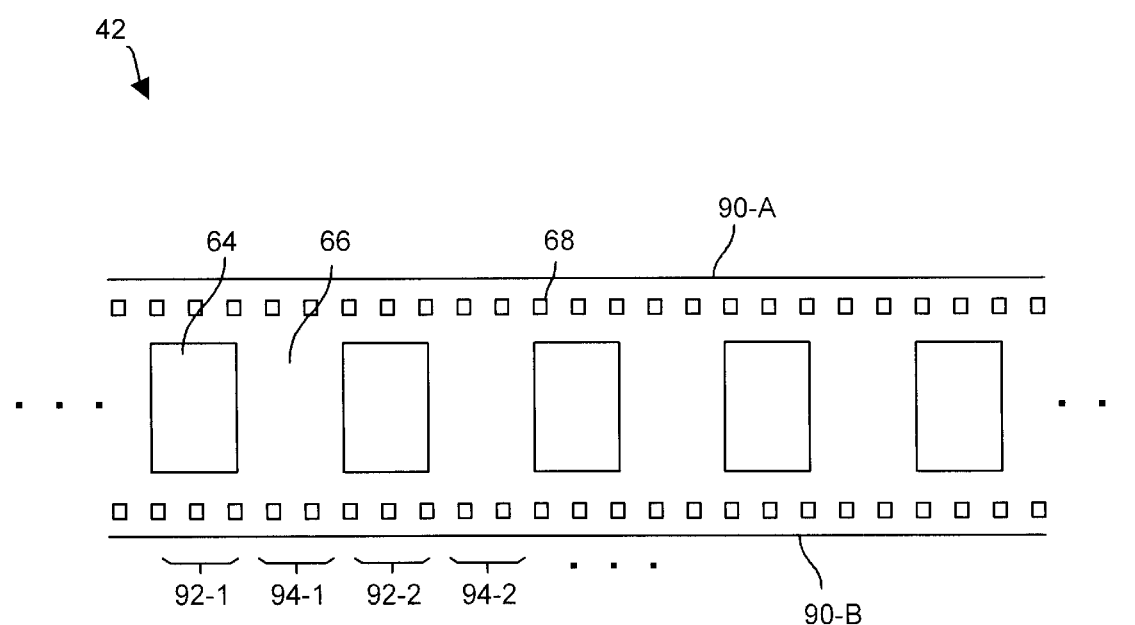
FIG. 3 is a top view of film which is suitable for use by the optical connection system of FIGS. 1A and 1B.

FIG. 3 shows details of the film 42 used by a film positioning assembly 30. As shown, the film 42 includes edges 90-A, 90-B. The holes 68 run along the edges 90-A, 90-B. Additionally, the film 42 includes multiple windowed sections 92 (e.g., 92-1, 92-2, . . . ) and multiple non-windowed sections 94 (e.g., 94-1, 94-2, . . . ). Each windowed section 92 defines a window 64. Each non-windowed section 94 includes a film portion 66 rather than a window 64. The windowed sections 92 and non-windowed sections 94 are interleaved with each other. As described earlier, the optical interface 38 and the set of lift surfaces 84 fit within the window 64 of each windowed section 92.

Figure 4:
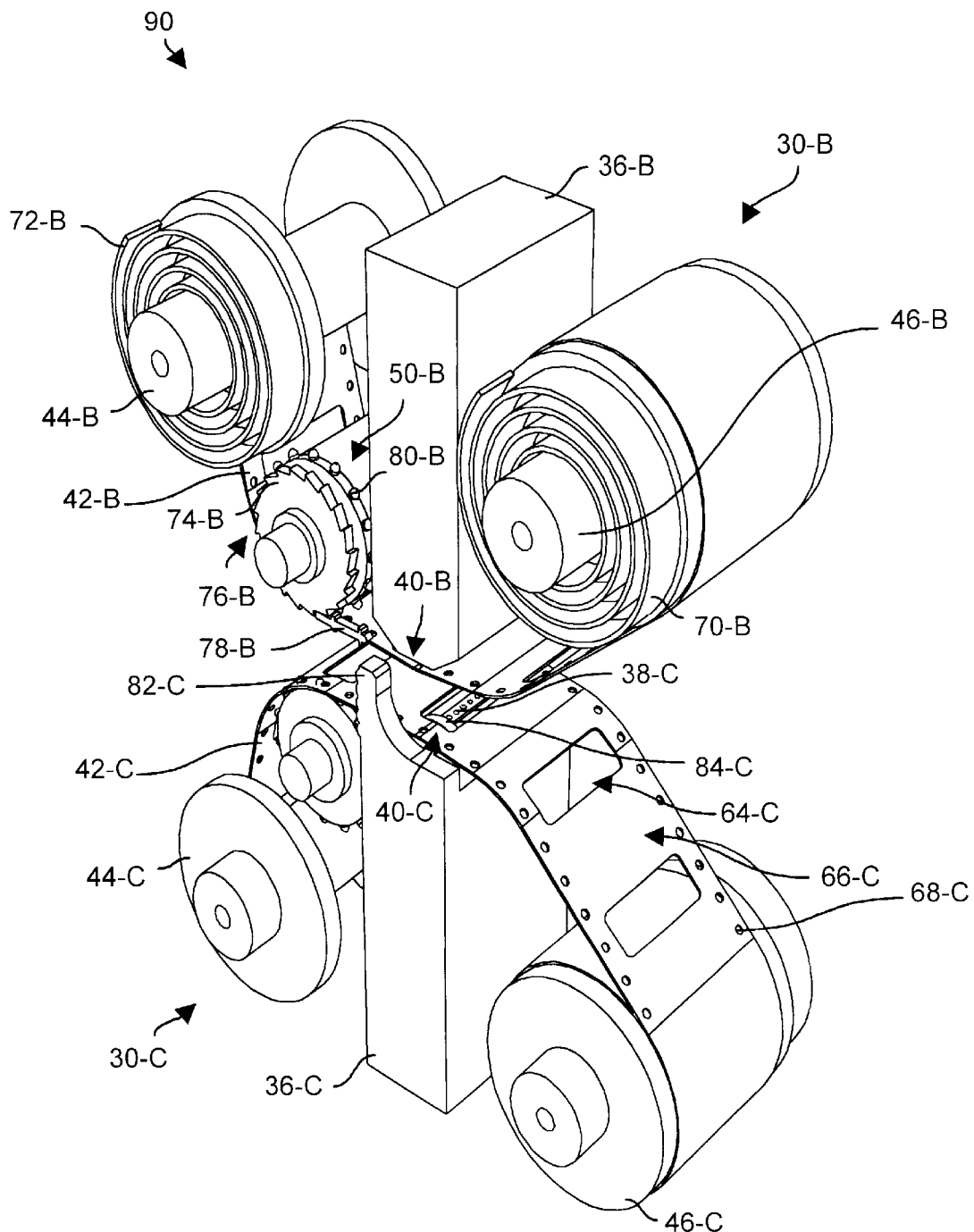
FIG. 4 is a perspective view of portions of two optical connectors of the optical connection system of FIGS. 1A and 1B in the process of forming a set of optical connections.

FIG. 4 shows a perspective view 90 of the film positioning assemblies 30-B and 30-C of FIG. 1B when the film positioning assemblies 30-B. and 30-C are brought toward each other in order to form a set of optical connections. In particular, as shown in FIG. 4, the ratchet driver 82-C of the film positioning assembly 30-C aligns with an end of the ratchet arm 78-B of the film positioning assembly 30-B. When the film positioning assemblies 30-B, 30-C are brought closer together, the ratchet driver 82-C actuates the ratchet assembly 50-B to move the film 42-B so that a window 64 of the film 42-B resides over the optical interface location 40-B to expose the optical interface 38-B. Concurrently, on the opposite side of the film positioning assemblies 30-B and 30-C, the ratchet driver 82-B of the film positioning assembly 30-B aligns with an end of the ratchet arm 78-C of the film positioning assembly 30-C. Accordingly, as the film positioning assemblies 30-B, 30-C move closer together, the ratchet driver 82-B actuates the ratchet assembly 50-C to move the film 42-C such that a window 64 of the film 42-C resides over the optical interface location 40-C to uncover the optical interface 38-C. As a result, the optical interfaces 38-B, 38-C contact to form a set of fiber optic connections. The likelihood of dust or dirt contaminating the optical interfaces 38-B, 38-C is remote since the optical interfaces 38-B, 38-C were only exposed a short period of time just prior to connecting with each other. Accordingly, there is no need for a technician to manually clean the optical interfaces 38-B, 38-C. Further details of the invention will now be described with reference to FIG. 5.

Figure 5:
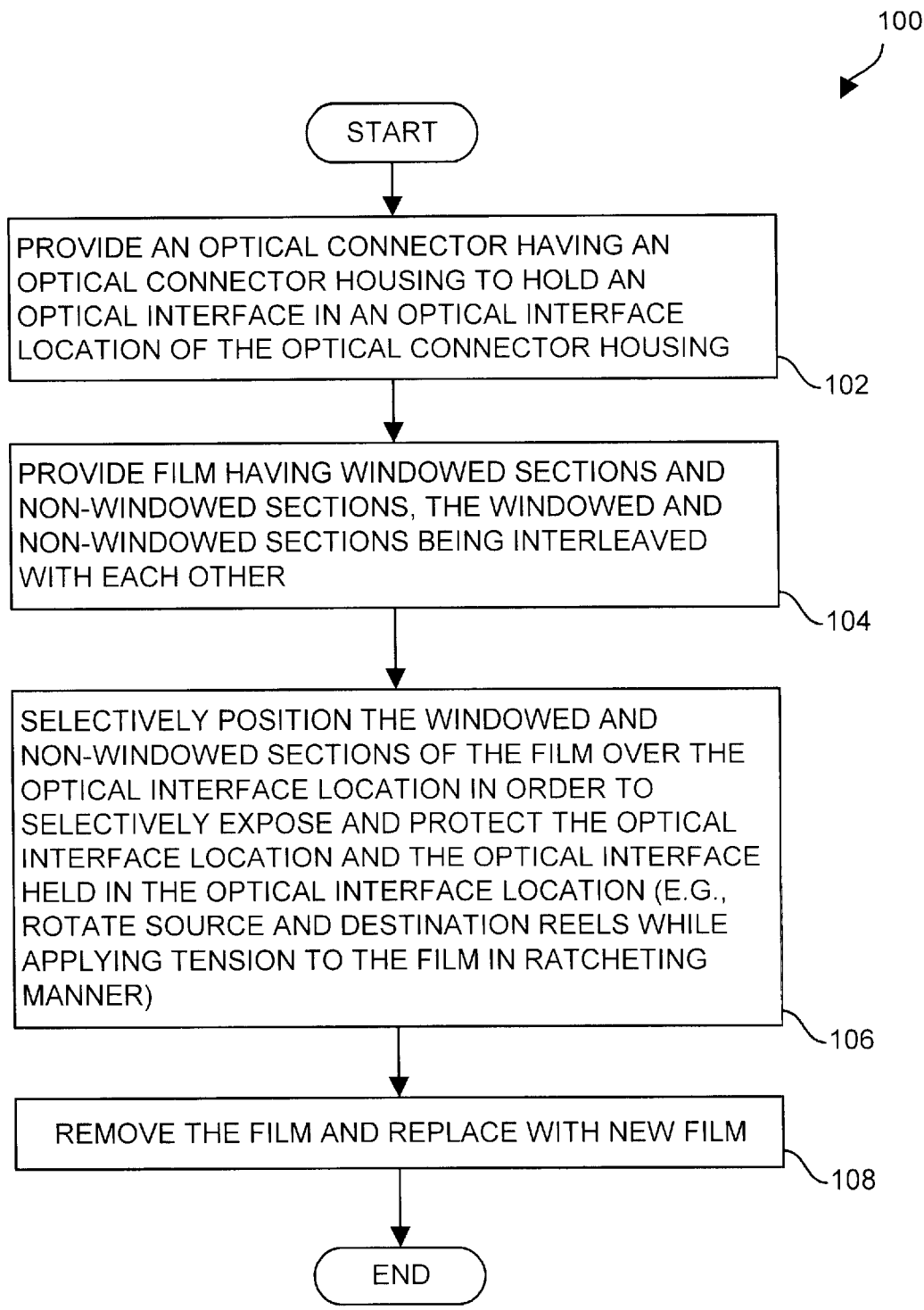
FIG. 5 is a flowchart of a procedure which is performed by a user operating the optical connection system of FIGS. 1A and 1B.

FIG. 5 shows a flowchart of a procedure 100 which is performed by a user of the connection system 20 of FIGS. 1A and 1B. In step 102, the user provides an optical connector 27 having an optical connector housing 30 for holding an optical interface 38 in an optical interface location 40 of the optical connector housing 30.

In step 104, the user provides film 42 having windowed sections and non-windowed sections. Preferably. the windowed sections and non-windowed sections are interleaved with each other (e.g., see sections 92, 94 of FIG. 3).

In step 106, the user selectively positions the windowed and non-windowed sections of the film 42 over the optical interface location 40-B in order to selectively expose and protect the optical interface location 40 and the optical interface 38. In particular, the ratchet assembly 50 operates to move the film 42 over the optical interface location 40. In response, the source reel 46 rotates to provide sections of the film 42, and the destination reel 44 rotates to take up used sections of the film 42.

In step 108, which is optional, the user removes the film 42, and replaces it with new film 42. This prevents reuse of the film 42 which could contaminate the optical interface location 40 and the optical interface 38. The procedure 100 will be explained in further detail with reference to the following example.

Supposed that a technician (a user) needs to do some work on the connection system 20 of FIGS. 1A and 1B. In particular, suppose that the technician needs to connect the circuit board 32 with another circuit board via fiber optic cable. To this end, the technician provides the fiber optic cable assembly 22 having the optical connector 27-B that includes the optical connector housing 36-B that holds the optical interface 38-B (step 102).

Preferably, the film 42-B is already installed over the optical interface location 40-B. In particular, a non-windowed film portion 66 of the film 42-B (e.g., see non-windowed section 94-1 in FIG. 3) preferably covers the optical interface 38-B to protect the optical interface 38-B from dirt and dust as the technician handles the fiber optic cable assembly 22 (step 104).

The technician then connects the connector 27-B of the fiber optic cable assembly 22 with the connector 27-C of the circuit board 24. As the technician brings the two connectors 27-B, 27-C together, the film positioning assembly 30-B positions the film 42-B such that a windowed portion of the film 42-B moves over the optical interface location 40-B (e.g., see windowed section 92-1 in FIG. 3) to expose the optical interface 38-B. In particular, the ratchet driver 82-C (also see FIG. 2) of the connector 27-C actuates the ratchet assembly 50-B of the connector 27-C to move the windowed portion of the film 42-B over the optical interface location 40-B (step 106).

Concurrently, for the connector 27-C, the film positioning assembly 30-C positions the film 42-C such that a windowed portion of the film 42-C moves over the optical interface location 40-C (e.g., see windowed section 92-2 in FIG. 3) to expose the optical interface 38-C. In particular, the ratchet driver 82-B of the connector 27-B actuates the ratchet assembly 50-C of the connector 27-C to move the windowed portion of the film 42-C over the optical interface location 40-C. Accordingly, both optical interfaces 38-B, 38-C are exposed to each other in an automated manner just before connection. The exposed optical interfaces 38-B, 38-C align and contact each other to form a set of fiber optic connections.

In later tasks (e.g., subsequent visits), the technician can disconnect and reconnect the fiber optic cable assembly 22. For example, when the technician disconnects the fiber optic cable assembly 22 from the circuit board 24 (see FIG. 1B), the ratchet driver 82-C of the connector 27-C actuates the ratchet assembly 30-B of the connector 27-B to move the film 42-B. In particular, the ratchet assembly 30-B moves the film 42-B such that a non-windowed portion of the film 42-B (e.g., see non-windowed section 92-2 in FIG. 3) resides over the optical interface 30-B to protect the optical interface 30-B from contamination. Similarly, the ratchet driver 82-B of the connector 27-B actuates the ratchet assembly 30-C of the connector 27-C to move a non-windowed portion of the film 42-C (e.g., see non-windowed section 94-2 in FIG. 3) over the optical interface 38-C to protect that interface 38-C.

After a set number of connections and disconnections, the films 42-B, 42-C will run out (i.e., reach the end of the source reels 46-B, 46-C). At that time, the technician can replace the films 42-B, 42-C with new film (step 108). Such replacement has less likelihood of contaminating the optical interfaces 38-B, 38-C than with reuse of the original films 42-B, 42-C.

As described above, the fiber optic connection system 20 of FIGS. 1A and 1B allows the technician to perform the procedure 100 of FIG. 5 conveniently without the burden of manually cleaning the optical interfaces 38. Rather, the optical interfaces 38 are selectively exposed just before connection and covered just before disconnection in an automated manner reducing the likelihood that the optical interfaces 38 will become contaminated. Accordingly, the technician does not need to manually clean the optical interfaces 38 when handling the components of the connection system 20. Further details of how a film positioning assembly 30 moves the film 42 will now be provided with reference to FIGS. 6A through 6E.

Figure 6A:
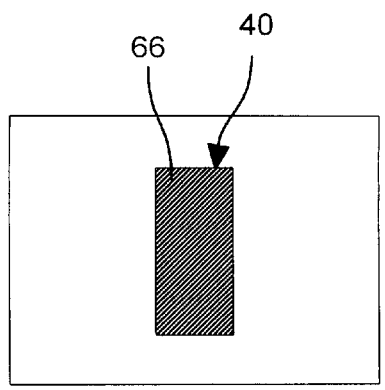
FIG. 6A is a top view of an optical interface location of an optical connector of the optical connection system of FIGS. 1A and 1B when a non-windowed section of film resides over the optical interface location.

FIG. 6A is a top view of the optical interface location 40 of FIG. 2 when a non-windowed portion 66 of the film 42 (also see non-windowed section 94-1 in FIG. 3) resides over the optical interface 38. This is the position of the film 42 when the connector 27 is unconnected. As such the optical interface 38 is protected against contamination.

Figure 6B:
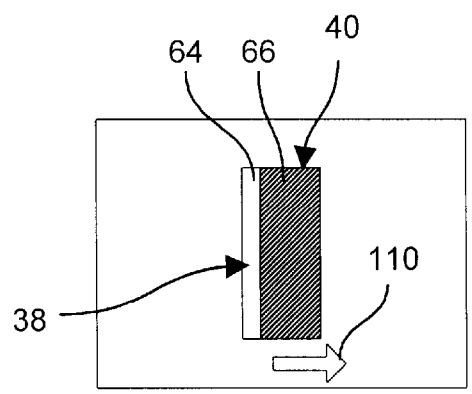
FIG. 6B is a top view of the optical interface location of FIG. 6A when the film transitions from the non-windowed section to a windowed section of the film residing over the optical interface location.

FIG. 6B is a top view of the optical interface location 40 when the film 42 over the optical interface location 40 transitions from the non-windowed portion 66 to a window 64. The motion of the film 42 is illustrated by the arrow 110. As shown, a portion of the optical interface 38 is exposed through the windowed portion 64 of the film 42. This is a situation that occurs during connection of the connector 27 with another connector 27.

Figure 6C:
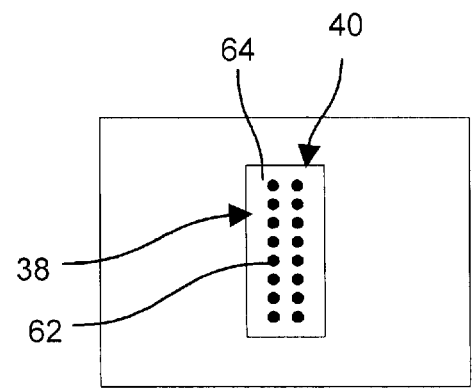
FIG. 6C is a top view of the optical interface location of FIG. 6B when the windowed section of the film resides over the optical interface location.

FIG. 6C is a top view of the optical interface location 40 when the window 64 of the film 42 resides over the optical interface 38 (also see windowed section 92-2 in FIG. 3). As shown, fiber ends 62 of the optical interface 38 are exposed through the window 64. This is the position of the film 42 when the connector 27 is completely connected with the other connector 27.

Figure 6D:
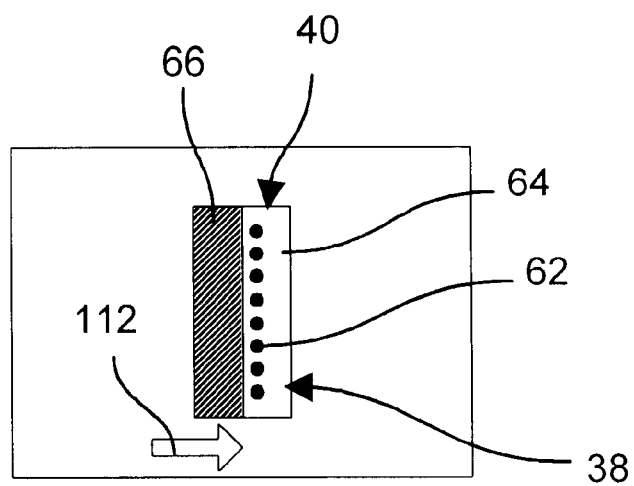
FIG. 6D is a top view of the optical interface location of FIG. 6C when the film transitions from the windowed section to another non-windowed section of the film residing over the optical interface location.

FIG. 6D is a top view of the optical interface location 40 when the film 42 over the optical interface location 40 transitions from the window 64 to another non-windowed film portion 66. The motion of the film 42 is illustrated by the arrow 112. As shown, some of the non-windowed portion 66 covers part of the optical interface 38. This is a situation that occurs during disconnection of the connector 27 from the other connector 27.

Figure 6E:
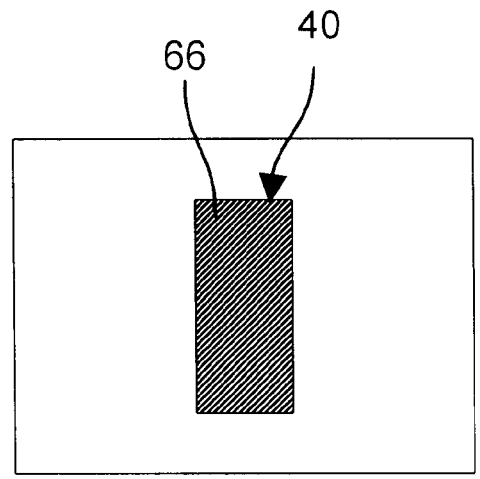
FIG. 6E is a top view of the optical interface location of FIG. 6B when the other non-windowed section of the film resides over the optical interface location.

FIG. 6E is a top view of the optical interface location 40 when the other non-windowed film portion 66 of the film 42 completely covers the optical interface 38 (also see non-windowed section 94-2 in FIG. 3). This is the position of the film 42 when the connector 27 is disconnected from the other connector 27. Further details of the invention will now be provided with reference to FIGS. 7A, 7B and 7C.

Figure 7A:
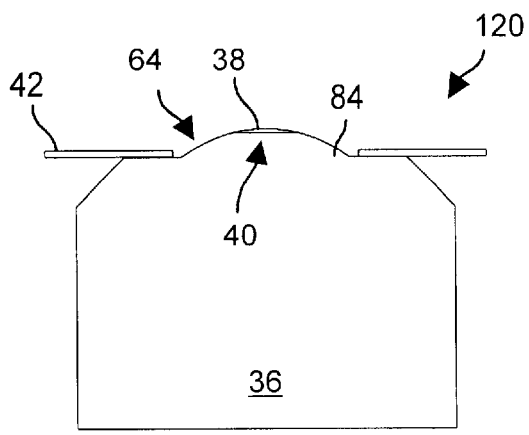
FIG. 7A is a cross-sectional side view of the optical interface location of FIG. 6C when the windowed section of film of FIG. 6C resides over the optical interface location.

FIG. 7A is a cross-sectional side view of the optical interface location 40 of the connector 27 of FIG. 2 when a windowed portion of the film 42 resides over the optical interface location 40 (also see FIG. 6C). As shown, the set of lift services 84 framing the optical interface 38 fits through the window 64 of the film 42. Recall that the set of lift services 84 are defined by the optical connector housing 28. Accordingly, the optical interface 38 can freely contact the optical interface 38 of another connector 27.

Figure 7B:
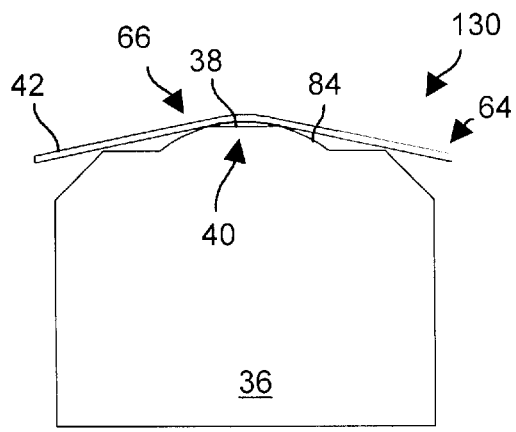
FIG. 7B is a cross-sectional side view of the optical interface location of FIG. 6E when the non-windowed section of film of FIG. 6E resides over the optical interface location.

FIG. 7B is a cross-sectional side view of the optical interface location 40 of the connector 27 of FIG. 2 when a non-windowed portion of film 42 resides over the optical interface location 40 (also see FIGS. 6A and 6E). As shown, the set of lift services 84 framing the optical interface 38 lift the non-windowed portion 66 of the film 42 out of contact with the optical interface 38 in order to protect the optical interface 38 from damage (e.g., scratches, contamination, etc.).

Figure 7C:
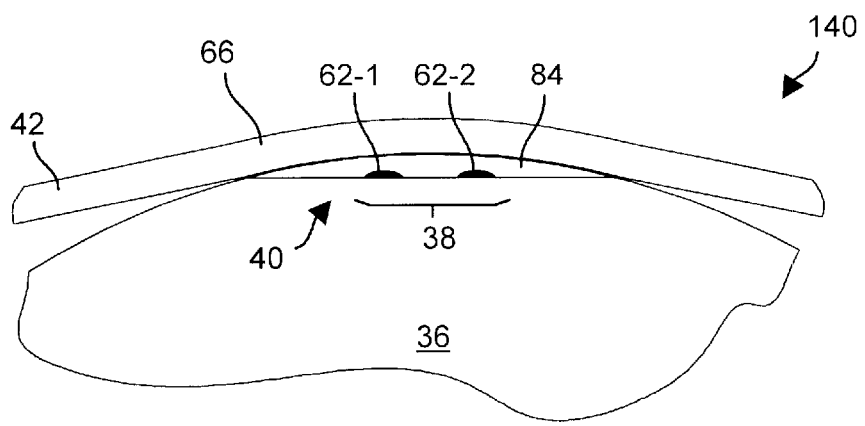
FIG. 7C is a close-up cross-sectional side view of the optical interface location of FIG. 7B.

FIG. 7C is a close-up cross-sectional side view of the optical interface location 40 of FIG. 7B. As shown, and by way of example only, the optical interface 38 includes two rows 62-1, 62-2 of fiber ends which are held in the optical interface location 40 of the optical connector housing 28. As shown, the non-windowed portion 66 of the film 42 is pushed out of contact with the rows 62-1, 62-2 of fiber ends to prevent damaging the fiber ends. Further details of the invention will now be provided with reference to FIG. 8.

Preferably, portions of the connector housing 36 (e.g., the lift surfaces 84) press against the film 42 (due to tension provided by the film positioning assembly 30) to form a dust seal so that dust does not penetrate into an enclosed volume around the optical interface 38. In particular, there are preferably no gaps along the radius of the lift surface 84 (i.e., between the film 42 and the lift surface 84) for dust to pass through, as shown in FIG. 7C.

Figure 8:
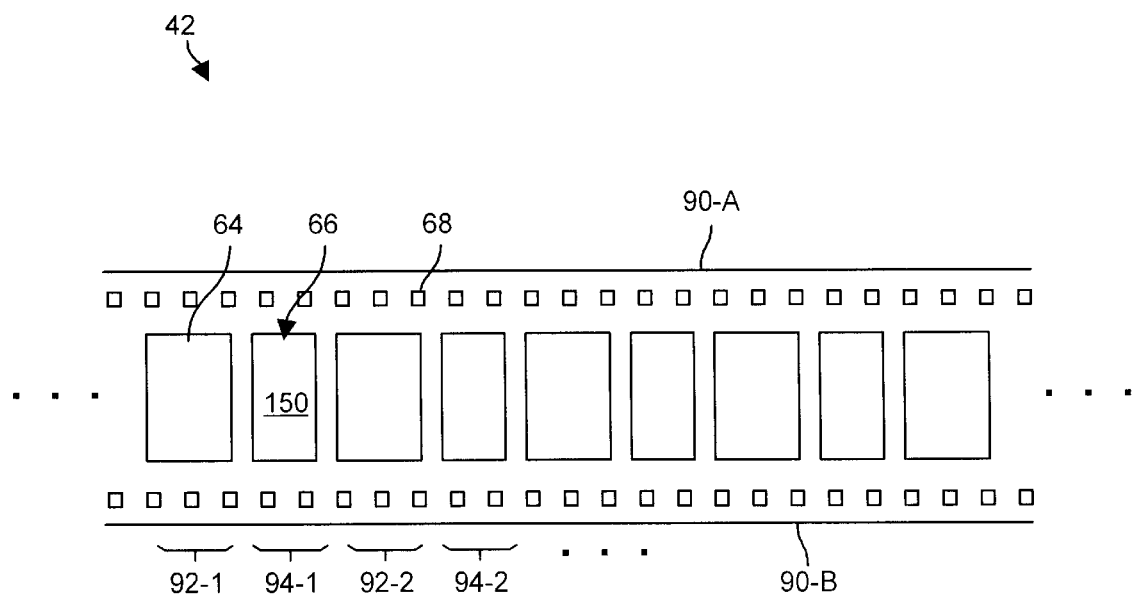
FIG. 8 is a top view of film which is a suitable alternative to the film of FIG. 3.

FIG. 8 is a top view of a film arrangement which is a suitable alternative for the film arrangement of FIG. 3. As shown in FIG. 8, the alternative arrangement for the film 42 includes cleaning material 150 in the non-windowed portions 66 of the film 42. Connectors 27 which use this alternative film arrangements do not include a set of lift services 84 for pushing the non-windowed portions 66 of the film 42 out of contact with the optical interface 38. Rather, the cleaning material 150 on the non-windowed portions 66 contacts the optical interface 38 in order to clean the optical interface 38. In one arrangement, the cleaning material 150 includes fabric (i.e., cloth) or paper that wipes the optical interface 38 free of dust and dirt. In another arrangement, the cleaning material 150 includes a solvent that dissolves and removes any dust or dirt on the optical interface 38. Accordingly, the optical interface 38 is cleaned in an automated manner thus alleviating the need for a technician to manually clean the optical interface 38.

As described above, the invention is directed to techniques for controlling access to an optical interface 38 using film 42 having windowed sections 92 and non-windowed sections 94. The windowed and non-windowed sections 92, 94 are electively positioned over an optical interface location 40, which holds the optical interface 38, in order to selectively provide access to the optical interface 38 and protect the optical interface 38 from dust and dirt. Preferably, such positioning of the film sections 92, 94 selectively exposes the optical interface 38 (and the optical interface location 40) just before connection, and covers the optical interface 38 just before disconnection, in an automated manner. Accordingly, it is unlikely that dirt or dust will contaminate the optical interface 38, and a technician does not need to perform an extensive cleaning step each time the technician handles the fiber optic equipment, e.g., each time the technician disconnects or reconnects a fiber optic connector 27 of a fiber optic component 22, 24. The features of the invention, as described above, may be employed in fiber optic systems, components and methods and other computer-related devices such as those of Teradyne, Incorporated of Boston, Mass.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the above described fiber optic connection system 20 was described as including a fiber optic cable assembly 22 and a circuit board 24 by way of example only. In other arrangements, the fiber optic connection system 20 includes different component configurations (e.g., two fiber optic cables that connect with each other, two circuit boards that connect with each other, etc.).

Additionally, it should be understood that the connectors 27 of the fiber optic connection system 20 can include elements which were not emphasized in the figures.

For example, the connectors 27 of the fiber optic connection system 20 of FIGS. 1A and 1B can include protective housings (i.e., protective casings) which surround the film positioning assemblies 30 and/or the ratchet assemblies 50 to protect such mechanisms from damage and contamination.

Furthermore, it should be understood that the ratchet assembly 50 of FIG. 2 can further include a spring that rotates the ratchet gear 74 when the ratchet gear 74 is not retained by the ratchet arm 78. Alternatively, the tension springs 70, 72 or other spring within the source or destination reels 44, 46 can provide rotation to the reels 44, 46, the ratchet gear 74, and the film 42.

Additionally, it should be understood that the windows 64 of the film 42 were described as being open holes within the film 42 that enabled an optical interface 38 to pass therethrough in order to contact a corresponding optical interface 38 and form a set of optical connections. In other arrangements, the windows 64 are transparent portions of film so that a set of optical connections is formed from one optical interface 38 through a transparent portion of film, optionally through another transparent portion of film (e.g., of another assembly), to another optical interface 38. In other arrangements, the film 42 is clear (i.e., transparent) and each non-windowed portion 66 is opaque (e.g., includes dye, ink, paint, etc.) to provide eye protection when the optical interface 38 is exposed.

Furthermore, the fiber optic connector 27 was described above as including a film positioning assembly 30 having a ratchet assembly 50 for moving the film 42. Essentially, the film positioning assembly 30 is a film advancing mechanism that moves the film 42 over the optical interface 38 unidirectionally. Other configurations are suitable as well. In one arrangement, this film advancing mechanism includes an electric motor rather than the ratchet assembly 50. A switch can activate the motor during mating and de-mating of the connectors 27. In another arrangement, the film positioning assembly 30 includes a unidirectional clutch or cam-based locking mechanism to advance the film 42. In another arrangement, the film 42 is advanced by being pulled by one or more hooks through holes in the film 42 (e.g., belted sprockets) which pull the film 42 over the optical interface 38 as the connector 27 mates and de-mates, and continuously maintains tension on the film 42. In another arrangement, the film 42 is advanced by a friction-type mechanism. For some of these arrangements, the mechanisms provide an urging or pushing force to move the film 42 over the optical interface 38. In other arrangements, the mechanisms provide a pulling force on the film 42 to move the film 42.

In yet another arrangement, the film advancement mechanism advances the film 42 using a stationary post that goes in a hole. To advance the film 42, the material between film holes is severed. It is acceptable to sever such portions of film 42 once they are used since those portions will not be used again.

Additionally, it should be understood that the film 42 can be used on multiple connectors 27. For example, the film 42 can cover several fiber optic connectors 27 simultaneously so that the optical interfaces 38 of those connectors 27 are (i) covered with a non-windowed portion 66 when the connectors 27 are unconnected thus preventing eye injury, and (ii) exposed when the connectors 27 mate with another set of connectors 27 (e.g., when a circuit board having multiple fiber optic connectors 27 mates with another circuit board having corresponding fiber optic connectors 27).

Furthermore, it should be understood that the film 42 was shown as being wrapped around reels 44, 46 by way of example only. In other arrangements, the film 42 is not wrapped around reels. For example, in one arrangement, the film 42 is initially folded up (e.g., similar to stenographer's tape) particular at the play out end.

What is claimed is:

1. An optical connector, comprising:
    an optical connector housing to hold an optical interface in an optical interface location of the optical connector housing;
    film having windowed sections and non-windowed sections, the windowed and non-windowed sections being interleaved with each other; and
    a film positioning assembly, coupled to the optical connector housing, that selectively positions the windowed and non-windowed sections of the film over the optical interface location in order to selectively expose and protect the optical interface location.

2. The optical connector of claim 1 wherein the film positioning assembly includes:
    a source reel, coupled to the optical connector housing, that rotates to provide the sections of the film; and
    a destination reel, coupled to the optical connector housing, that rotates to receive the sections of the film.

3. The optical connector of claim 2 wherein the film positioning assembly further includes:
   at least one tension spring, coupled to the optical connector housing, to provide tension to the film.

4. The optical connector of claim 2 wherein the film positioning assembly further includes:
   a ratchet assembly, coupled to the optical connector housing, that permits movement of the film from source reel to the destination reel and prohibits movement of the film from the destination reel to the source reel.

5. The optical connector of claim 1 wherein the film positioning assembly is configured to enable removal and replacement of the film.

6. The optical connector of claim 1 wherein the optical connector housing defines a set of film lift surfaces that (i) passes through windows of the windowed sections of the film, and (ii) pushes the non-windowed sections of the film out of contact with the optical interface location.

7. The optical connector of claim 1 wherein each non-windowed section of the film includes cleaning material that contacts the optical interface location of the optical connector housing when the film positioning assembly selectively positions that non-windowed section of the film over the optical interface location.

8. A method for providing accessing to an optical interface, the method comprising the steps of:
   providing an optical connector having an optical connector housing to hold an optical interface in an optical interface location of the optical connector housing;
   providing film having windowed sections and non-windowed sections, the windowed and non-windowed sections being interleaved with each other; and
   selectively positioning the windowed and non-windowed sections of the film over the optical interface location in order to selectively expose and protect the optical interface location.

9. The method of claim 8 wherein the step of selectively positioning includes the step of:
   rotating (i) a source reel to provide the sections of the film, and (ii) a destination reel to receive the sections of the film.

10. The method of claim 9, further comprising the step of applying tension to the film.

11. The method of claim 9 wherein the step of rotating includes the step of ratcheting the film between the source reel and the destination reel in order to permit movement of the film from source reel to the destination reel and prohibit movement of the film from the destination reel to the source reel.

12. The method of claim 8, further comprising the step of removing the film, and replacing the removed film with new film.

13. An optical component, comprising:
   an optical interface; and
   an optical connector including (i) an optical connector housing that holds the optical interface in an optical interface location of the optical connector housing, (ii) film having windowed sections and non-windowed sections, the windowed and non-windowed sections being interleaved with each other, and (iii) a film positioning assembly, coupled to the optical connector housing, that selectively positions the windowed and non-windowed sections of the film over the optical interface location in order to selectively expose and protect the optical interface.

14. The optical component of claim 13 wherein the film positioning assembly includes:
   a source reel, coupled to the optical connector housing, that rotates to provide the sections of the film; and
   a destination reel, coupled to the optical connector housing, that rotates to receive the sections of the film.

15. The optical component of claim 14 wherein the film positioning assembly further includes:
   at least one tension spring, coupled to the optical connector housing, to provide tension to the film.

16. The optical component of claim 14 wherein the film positioning assembly further includes:
   a ratchet assembly, coupled to the optical connector housing, that permits movement of the film from source reel to the destination reel and prohibits movement of the film from the destination reel to the source reel.

17. The optical component of claim 13 wherein the film positioning assembly is configured to enable removal and replacement of the film.

18. The optical component of claim 13 wherein the optical connector housing defines a set of film lift surfaces that (i) passes through windows of the windowed sections of the film, and (ii) pushes the non-windowed sections of the film out of contact with the optical interface.

19. The optical component of claim 13 wherein each non-windowed section of the film includes cleaning material that contacts the optical interface when the film positioning assembly selectively positions that non-windowed section of the film over the optical interface location.

20. A fiber optic connection system, comprising:
   a first optical connector having a first optical connector housing to hold a first optical interface in a first optical interface location of the first optical connector housing, and a first film advance mechanism that selectively positions windowed and non-windowed sections of a first film over the first optical interface location; and
   a second optical connector having a second optical connector housing to hold a second optical interface in a second optical interface location of the second optical connector housing, and a second film advance mechanism that selectively positions windowed and non-windowed sections of a second film over the second optical interface location.

* * * * *